US012783740B2

(12) United States Patent
Anquet et al.

(10) Patent No.: US 12,783,740 B2
(45) Date of Patent: Nov. 3, 2026

(54) EMULATION PROCESS AND CIRCUIT FOR A READ-ONLY MEMORY

(71) Applicant: STMicroelectronics International N.V., Geneva (CH)

(72) Inventors: Nicolas Anquet, Grenoble (FR); Gilles Pelissier, Champagnier (FR); Ruggero Susella, Milan (IT); Julien Montmasson, Salon de Povence (FR)

(73) Assignee: STMicroelectronics International N.V., Geneva (CH)

( * ) Notice: Subject to any disclaimer, the term of this patent is extended or adjusted under 35 U.S.C. 154(b) by 233 days.

(21) Appl. No.: 18/618,299

(22) Filed: Mar. 27, 2024

(65) Prior Publication Data

US 2024/0330518 A1 Oct. 3, 2024

(30) Foreign Application Priority Data

Mar. 31, 2023 (FR) ...................................... 2303156

(51) Int. Cl.
*G06F 21/78* (2013.01)
*G06F 21/64* (2013.01)
*G06F 21/72* (2013.01)

(52) U.S. Cl.
CPC .............. *G06F 21/78* (2013.01); *G06F 21/64* (2013.01); *G06F 21/72* (2013.01)

(58) Field of Classification Search
CPC .......... G06F 21/78; G06F 21/64; G06F 21/72; G06F 12/14; G06F 21/602; G06F 21/79; G06F 2212/1052; G06F 12/1408
See application file for complete search history.

(56) References Cited

U.S. PATENT DOCUMENTS 6,708,273 B1 3/2004 Ober et al.
8,180,928 B2 5/2012 Elzur et al.
8,832,460 B2 9/2014 Iizuka et al.
(Continued)

FOREIGN PATENT DOCUMENTS

EP 1870814 A1 12/2007
EP 2437198 A1 4/2012
(Continued)

OTHER PUBLICATIONS

INPI Search Report and Written Opinion for priority application, FR 2303156, report dated Nov. 15, 2023, 16 pgs.

*Primary Examiner* — Mohammad W Reza
(74) *Attorney, Agent, or Firm* — Crowe & Dunlevy LLC

(57) ABSTRACT

A circuit is configured to perform an operation between a volatile memory and a cryptographic circuit in response to a write access request for writing one or more data values in the memory. The access request further includes a storage address in the memory. The operation includes steps for: writing the one or more data values; and for each of the one or more data values, generating a write access request, in the cryptographic circuit, for the data value, and generating a write access request, in the cryptographic circuit of the storage address. Additionally, a verification, in response to a read access request, from the processor, of a verification value is performed. The verification operation includes steps for: comparing the verification value with a reference value; and based on the comparing, authorizing access the volatile memory only for reading.

15 Claims, 4 Drawing Sheets

(56) References Cited

U.S. PATENT DOCUMENTS

| | | | | |
|---|---|---|---|---|
| 8,904,076 | B2 | 12/2014 | Fernald | |
| 9,384,086 | B1 | 7/2016 | Craddock et al. | |
| 10,366,024 | B2 | 7/2019 | Craddock et al. | |
| 11,468,119 | B2 * | 10/2022 | Lee | G06F 12/1018 |
| 11,593,195 | B2 | 2/2023 | Brandon et al. | |
| 11,669,625 | B2 | 6/2023 | Durham et al. | |
| 12,117,949 | B2 | 10/2024 | Nandlinger et al. | |
| 2010/0071055 | A1 | 3/2010 | Kaniz et al. | |
| 2012/0008768 | A1 | 1/2012 | Mundra et al. | |
| 2014/0229739 | A1 | 8/2014 | Roth et al. | |
| 2016/0007071 | A1 * | 1/2016 | Burckard | H04N 21/42684<br>725/31 |
| 2019/0245686 | A1 | 8/2019 | Rahimi et al. | |
| 2019/0319781 | A1 | 10/2019 | Chhabra et al. | |
| 2020/0403779 | A1 | 12/2020 | Gopal et al. | |
| 2022/0262448 | A1 * | 8/2022 | Kim | G11C 29/56012 |
| 2023/0317137 | A1 * | 10/2023 | Li | G11C 29/023 |
| 2023/0342044 | A1 * | 10/2023 | Hong | G06F 21/79 |
| 2024/0078151 | A1 * | 3/2024 | Chao | G06F 11/10 |
| 2024/0256390 | A1 * | 8/2024 | Imtiaz | G06F 11/1453 |

FOREIGN PATENT DOCUMENTS

| | | | |
|---|---|---|---|
| WO | 0117163 | A1 | 3/2001 |
| WO | 2020190776 | A1 | 9/2020 |

* cited by examiner

EMULATION PROCESS AND CIRCUIT FOR A READ-ONLY MEMORY

PRIORITY CLAIM

This application claims the priority benefit of French Application for U.S. Pat. No. 2,303,156, filed on Mar. 31, 2023, the content of which is hereby incorporated by reference in its entirety to the maximum extent allowable by law.

TECHNICAL FIELD

The present disclosure relates generally to a process and a circuit that allow the emulation of a read-only memory.

BACKGROUND

A read-only memory (ROM) has the advantage of storing data immutably. However, read-only memories may have some limitations. In particular, there are read-only memories that are not reprogrammable, which may be a constraint for some applications. There are also reprogrammable read-only memories tend to be surface area and energy consuming.

A solution is to emulate a read-only memory with a random-access memory (RAM). However, it is important, for security reasons, to guarantee the integrity of stored data. It is also important to ensure, when writing a sequence of data values to the memory, that the written data values are correct. It is also advisable to ensure that these data values have been written to the correct addresses, that they are not written several times and the order of the sequence is respected.

There is also a need to improve the processes and circuits that guarantee the integrity of the stored data in a memory, such as a random-access memory that emulates a ROM-type memory.

SUMMARY

One embodiment provides a coupling and chaining bridge circuit configured to: perform a coupling operation between a volatile memory and a cryptographic circuit, both coupled to the coupling and chaining bridge circuit, in response to a write access request for writing one or more data values to the volatile memory, the write access request being from a processor coupled to the coupling and chaining bridge circuit, wherein the write access request further comprises an address for storing to the volatile memory, the coupling operation comprising: writing the one or more data values to the volatile memory; and for each of the one or more data values, generating a first write access request, in the cryptographic circuit, for the data value, and generating a second write access request, in the cryptographic circuit, for the storage address; operate a verification operation between the cryptographic circuit and the volatile memory, in response to a read access request from the processor, of a verification value stored in the cryptographic circuit, the verification operation comprising: a comparison of the verification value with a reference value stored in the coupling and chaining bridge circuit; and based on the comparison, an authorization of access to the volatile memory only for reading.

According to an embodiment, the above circuit is further configured to, in response to the read access request of the verification value from the processor, return a default value to the processor.

According to an embodiment, the above circuit is further configured to, when it is determined during the comparison that the verification value does not correspond to the reference value, delete the content of the volatile memory.

According to an embodiment, the above circuit comprises a register programmable by the processor allowing the configuration of the coupling and chaining bridge circuit.

According to an embodiment, the above circuit further comprises a second register configured to receive, from the processor, the reference value.

One embodiment provides an electronic device comprising: the above coupling and chaining bridge circuit; the cryptographic circuit coupled to the coupling and chaining bridge circuit via a first bus; the volatile memory coupled to the coupling and chaining bridge circuit via a second bus; and the processor coupled to the coupling and chaining bridge circuit via a system bus and a third bus.

According to an embodiment, the cryptographic circuit is configured to generate the verification value by performing one or more cryptographic operations on each data value and storage address and based on a secret key, wherein the secret key is accessible only in read-only mode on the cryptographic circuit.

According to an embodiment, the above device further comprises a second cryptographic circuit coupled to the coupling and chaining bridge circuit and comprising the volatile memory.

One embodiment provides a process comprising: operating a coupling operation through a coupling and chaining bridge circuit of an electronic device, based on the reception, by the coupling and chaining bridge circuit, of a write access request, from a processor of the device, for writing one or more data values in a volatile memory of the device, each data value being associated with a storage address in the volatile memory, the coupling operation comprising: intercepting, by the coupling and chaining bridge circuit, the write access request; for each of the one or more data values, generating a first write access request of the data value and a second write access request of the associated storage address in a first cryptographic circuit; and for each of the one or more data values, writing to the volatile memory; executing a verification operation, by the coupling and chaining bridge circuit, based on the reception, by the coupling and chaining bridge circuit, of an access request, from the processor, to read a verification value stored in the first cryptographic circuit, the verification operation comprising: reading, by the coupling and chaining bridge circuit, the verification value and comparing with a reference value that is stored in the coupling and chaining bridge circuit; and authorizing access, only for reading, to the content of the volatile memory, based on the comparison.

According to an embodiment, the coupling and chaining bridge circuit is configured to return a default value, for example a sequence of zeros, to the processor in response to the read access request of the verification value.

According to an embodiment, the first cryptographic circuit is configured to generate the verification value by applying, to each received data value and to each storage address, one or more cryptographic operations, the one or more cryptographic operations being further performed based on a secret key.

According to an embodiment, the one or more cryptographic operations are hashing operations and/or operations of a cryptographic algorithm of Advanced Encryption Standard-Galois/Counter Mode (AES-GCM) type or of Advanced Encryption Standard-Counter with cipher block chaining message authentication code (AES-CCM) type comprising the generation of said verification value.

According to an embodiment, the processor is configured to transmit the reference value to the coupling and chaining bridge circuit before transmitting the write access request.

According to an embodiment, the above process further comprises, suppressing the content of the volatile memory, controlled by the coupling and chaining bridge circuit, when during the comparison, it is determined that the verification value does not correspond to the reference value.

According to an embodiment, the above process further comprises, before the coupling operation, writing, by the processor and in a register of the coupling and chaining bridge circuit, of the reference value.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the algorithms to generate message authentication codes (MAC) that integrate, for example, hashing operations and/or cryptographic functions, are known by the person skilled in the art and are not described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms “front”, “back”, “top”, “bottom”, “left”, “right”, etc., or to relative positional qualifiers, such as the terms “above”, “below”, “higher”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1:
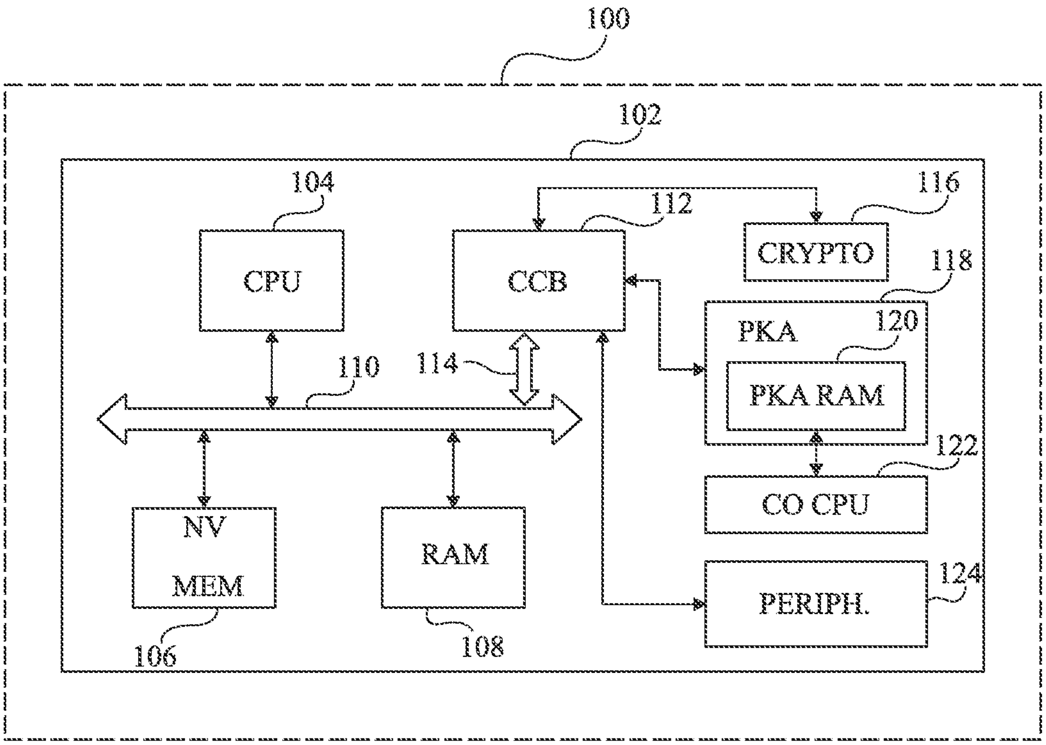
FIG. 1 is a block diagram of an electronic device according to an embodiment of the present disclosure.

FIG. 1 is a block diagram of an electronic device 100 that comprises an integrated circuit 102 according to an embodiment of the present disclosure.

The electronic device 100 is, for example, a mobile electronic device, such as a cellular phone, or an electronic card, such as a microcircuit card.

The circuit 102 comprises, for example, a processor 104 (CPU) coupled to a read-only memory 106 (NV MEM) and to a volatile memory 108 (RAM) via a system bus 110. As an example, the memory 106 is a Flash-type memory, and the memory 108 is a RAM-type memory.

According to an embodiment, the circuit 102 further comprises a coupling and chaining bridge circuit 112 (CCB) coupled to the bus 110 via a bus 114. The bus 114 is, for example, an Advanced High-performance Bus (AHB). In other examples, the bus 114 is an Advanced Peripheral Bus (APB) or an Advanced External Interface (AXI) bus.

The circuit 102 further comprises a cryptographic circuit 116 (CRYPTO). The cryptographic circuit 116 is configured, for example, to generate message authentication codes (MAC). Generating message authentication codes comprises, for example, the application of one or more cryptographic operations, such as, for example, hashing operations and/or cryptographic operations such as Cipher Message Authentication Code (CMAC) and/or Galois Message Authentication Message (GMAC) functions. In another example, the cryptographic circuit 116 is configured, additionally or alternatively, to generate message authentication codes to encrypt received data values, for example by applying to them a symmetric encryption algorithm, such as, for example, an Advanced Encryption Standard-Galois Counter Mode (AES-GCM) algorithm or an Advanced Encryption Standard-Counter with Cipher block chaining Message authentication Code (AES-CCM) algorithm. As an example, the generation of the message authentication code and/or the application of cryptographic operations rely on the use of a secret key. As an example, the secret key is proper to the device 100. In other words, the value of the secret key varies from a device 100 to another. As an example, the secret key is derived from the value of a Physically Unclonable Function (PUF).

The circuit 102 further comprises another cryptographic circuit 118 (PKA). As an example, the circuit 118 is a public key accelerator configured to perform cryptographic operations according to an asymmetric cryptographic algorithm based on a public key.

The cryptographic circuit 118 comprises or is coupled to a volatile memory 120 (PKA RAM). As an example, the memory 120 is a random-access memory. The volatile memory 120 is, for example, coupled to a coprocessor 122 (CO CPU) of the circuit 102. In some examples, the coprocessor 122 is the same circuit of the processor 104. Thus, in an example, the random-access memory 120 is coupled to the processor 104.

As an example, the coupling and chaining bridge 112 is further coupled to other peripheral circuits 124 (PERIH.) The other peripheral circuits 124 comprise, for example, one or more cryptographic circuits, a cyclic redundancy check circuit, etc.

According to an embodiment, the coupling and chaining bridge 112 is configured to perform coupling and chaining operations between the cryptographic circuits 116 and 118, and more specifically between the cryptographic circuit 116 and the volatile memory 120.

According to an embodiment, after the coupling and chaining operations between the cryptographic circuit 116 and the volatile memory 120, the volatile memory 120 is configured to emulate a read-only memory, which means a memory accessible for reading only, whose integrity of the content is guaranteed.

Figure 2:
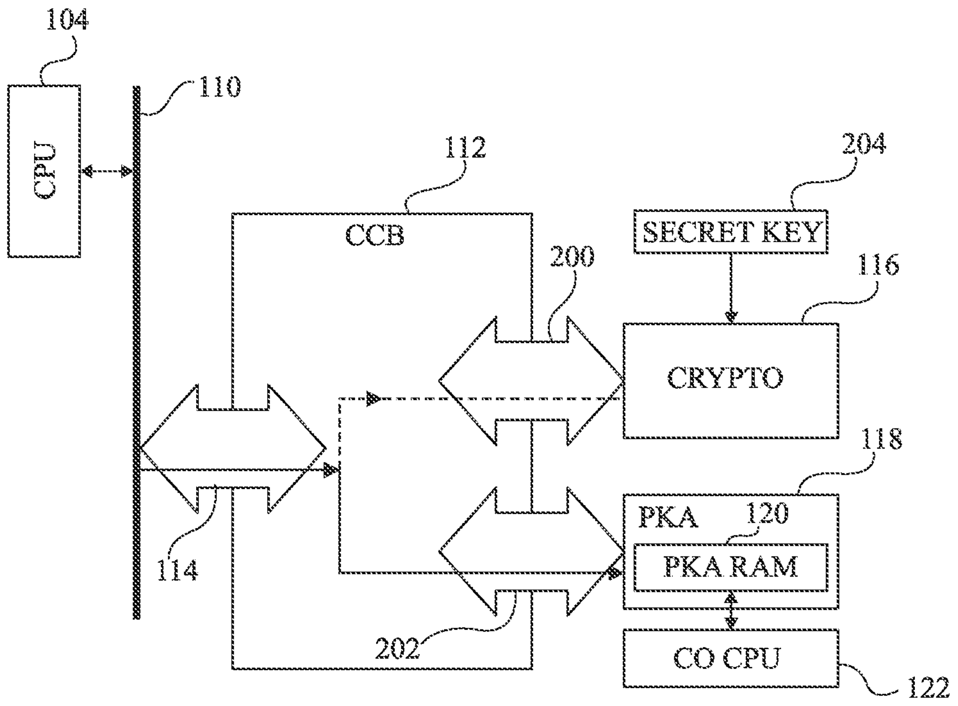
FIG. 2 is a block diagram that illustrates a coupling operation performed by the coupling and chaining bridge circuit.

FIG. 2 is a block diagram that illustrates an example of a coupling operation that is performed by the coupling and chaining bridge 112.

According to an embodiment, the processor 104 is configured to transmit to the coupling and chaining bridge circuit 112 a write access request for a sequence of one or more data values in the volatile memory 120. The data values are, for example, each associated to a storage address in the volatile memory 120.

According to an embodiment, the coupling and chaining bridge 112 is configured to perform a coupling operation by intercepting the write access requests for each data value of the sequence to the volatile memory 120 from the processor 104 and transmitted via the bus 114. The coupling operation further comprises generating, after each received write access request, two new write access requests. The new access requests are transmitted via the coupling and chaining bridge 112 and a bus 200 to the cryptographic circuit 116. As an example, the two write access requests comprise a write access request of the data value and another write access request of the storage address in the volatile memory 120. The coupling operation further comprises writing the data sequence in the circuit 118, and more specifically in the memory 120. As an example, the data sequence is transmitted to the volatile memory 120 via a bus 202.

The circuit 116 is configured, for example, after reception of each data value and address, to perform one or more cryptographic operation based on a secret key 204 (SECRET KEY). As an example, the value of the secret key depends on the device 100 and varies from a device to another. As an example, the secret key 204 is derived from a hardware key such as a Hardware Unique Key (HUK). In another example, the secret key is a hardware key, for example resulting from a PUF value. The secret key is, for example, regenerated by a PUF regeneration circuit (not illustrated) each time an operation with this key is to be performed by the circuit 116. In another example, the secret key is a value that was defined upstream, for example when manufacturing the device 100. The value of the secret key is, for example, additionally encrypted, for example thanks to a hardware key, such as a derived hardware unique key (DHUK). As an example, the value of the DHUK key depends on the context of use of the circuit 102. For each received data value and storage address, the result of the one or more cryptographic operations is, for example, stored in an internal register of the cryptographic circuit 116. As an example, the result is updated on the fly after each new received data value and address, and this result is, for example, a verification value.

As an example, the verification value is further included in a Binary Large Object (BLOB) type binary object. The verification value, for example, is a concatenation of each of the results of these cryptographic operations performed on the values and addresses. Thus, the verification value comprises a specification about the order of reception of the data values of the sequence. In another example, the value of the secret key is selected, for example by the user of the device 100, at the moment of the creation of the binary object. As an example, the binary object is made of the data sequence to be written to memory 120, of a private key encrypted with a secrete key and of the verification value. The verification value is, for example, calculated from the data sequence and the secret key. Thus, the verification value is proper to each data sequence, secret key and configuration of the memory 120. Thus, the verification value depends on the value of the secret key. The verification value will then be different for two different secret keys.

Figure 3:
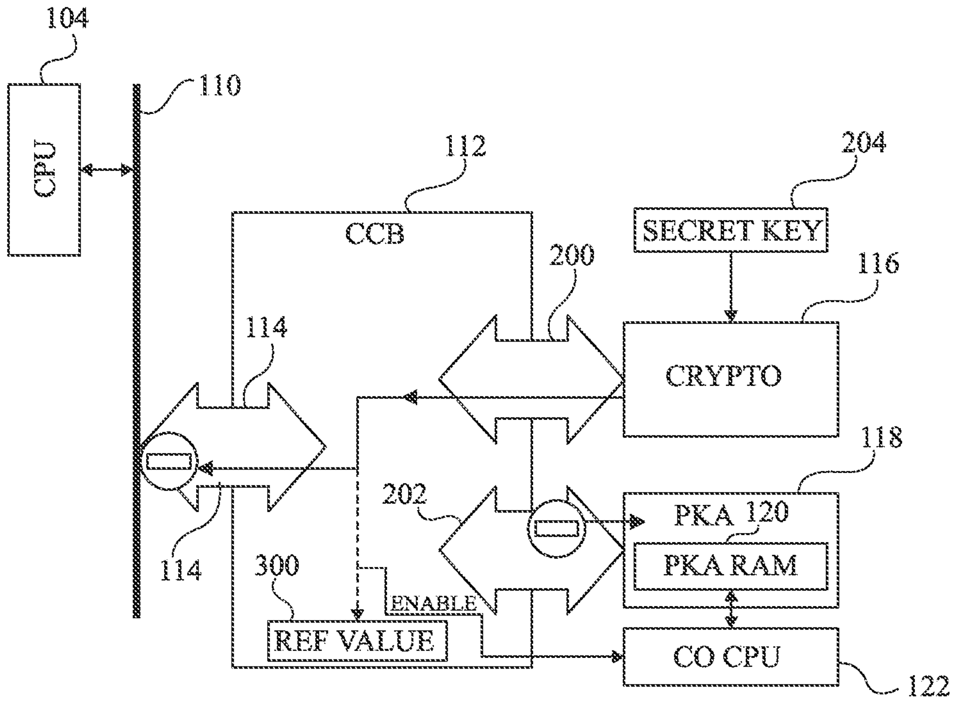
FIG. 3 is a block diagram that illustrates a checking operation performed by the coupling and chaining bridge circuit.

FIG. 3 is a block diagram that illustrates a verification operation performed by the coupling and chaining bridge 112.

According to an embodiment, the processor 104 is configured to transmit, prior to the write access request in the volatile memory 120, a reference value (REF VALUE) to the coupling and chaining bridge 112. The reference value is calculated, for example, at the moment of generation of the binary object. The reference value is calculated, for example, similarly as the verification value. As an example, after its generation, the reference value is stored in a register of the circuit 116. Thus, the verification value and the reference value are equal when the data sequence is not corrupted or modified, and when writing each data value is made at the right address. Thus, as an example, the reference value is stored in an internal register 300 of the coupling and chaining bridge 112. Using the secret key in the calculation of the reference value makes it suitable for the device 100. Hence, the reference values calculated with a device similar to the device 100 cannot be used with any other device.

Since the value of the secret key is unknown to the processor 104, the reference value is calculated in controlled and secured conditions. For example, these conditions are satisfied when the data values that are written in the memory 120 by the processor 104 are known as authentic.

According to an embodiment, the coupling and chaining bridge 112 is configured to perform a coupling and chaining operation between the circuits 116 and 118, and more specifically between the cryptographic circuit 118 and the volatile memory 120. The checking operation is performed, for example, after reception of a write access request from the processor 104 for the verification value stored in the cryptographic circuit 116.

As an example, in response to the write access request of the verification value, the coupling and chaining bridge 112 is configured to return a default value, for example a zero value, such as a string of zeroes, to the processor 104.

During the realization of the verification operation, the coupling and chaining bridge 112 is configured, for example, to access the verification value that is stored in the cryptographic circuit 116 and to compare it to the reference value that is stored in the register 300.

According to an embodiment, when the reference value is different from the verification value, the coupling and chaining bridge 112 is configured to command the suppression of the content of the volatile memory 120.

According to an embodiment, when the reference value corresponds to the verification value, the coupling and chaining bridge 112 is configured to authorize the access in read-only mode to the volatile memory 120. Hence, the coupling and chaining bridge 112 is further configured to forbid any write access request, for example from the processor 104, to the volatile memory 120. As an example, the coupling and chaining bridge 112 is configured to transmit an enable signal ENABLE to the co-processor 122 to give it write access to the volatile memory 120. As an example, the processor 104 and the co-processor 122 do not have access to the memory 120 as long as the verification and reference values have not been compared or do not correspond. The coupling and chaining bridge 112 is configured, for example, to authorize the co-processor 122 to access in read-only mode to the memory 120 only when the comparison between the verification and reference values has been performed and when both values correspond. In another example, the coupling and chaining bridge 112 is configured to authorize the co-processor 122 and the processor 104 to access in read-only mode to the memory 120 only when the comparison between the verification and reference values has been performed and when both values correspond. In another example, the circuit 122 is configured to block the processor 104 and/or the co-processor 122 to access in reading mode to the memory 120 when the write operations to the memory 120 are not over.

As an example, the cryptographic circuit 118 has access to the data stored in the memory 120 when the reference value corresponds to the verification value. For example, the cryptographic circuit 118 has the possibility to perform one or more cryptographic operations, for example asymmetric cryptographic operations, on one or more data values in the volatile memory 120. In another example, the circuit 122 is configured to block the processor 104 and/or the co-processor 122 to access the memory 120 in reading mode when the write operations to the memory 120 are not over.

Figure 4:
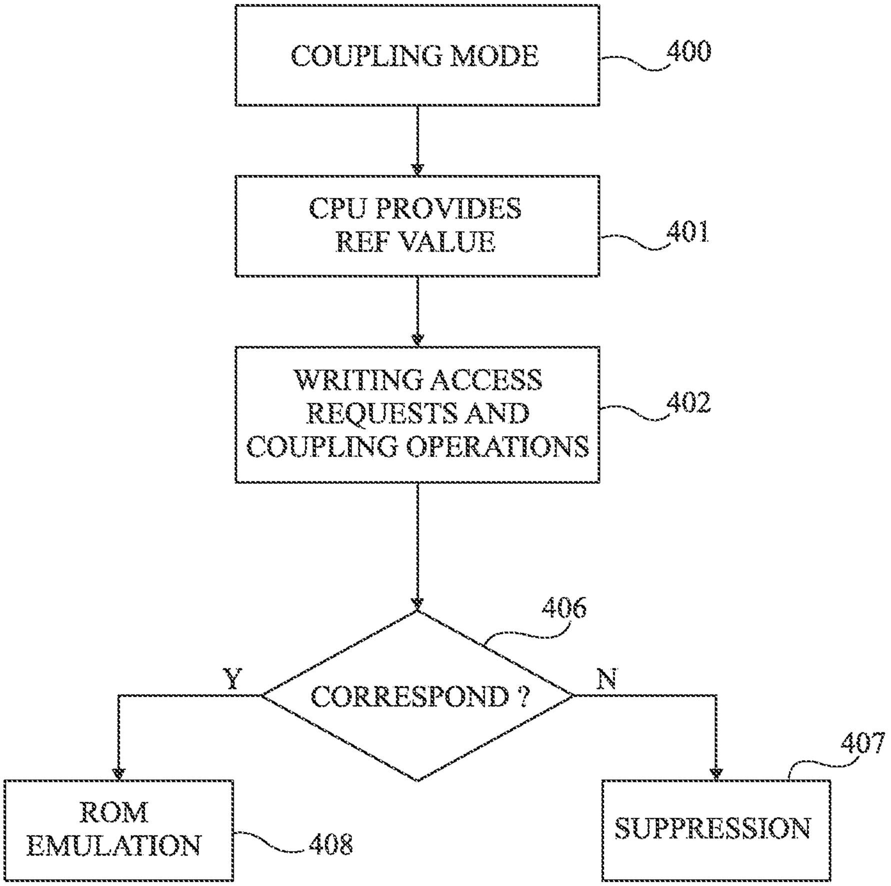
FIG. 4 is a flow diagram that illustrates the steps of a process according to an embodiment of the present disclosure.

FIG. 4 is a flow diagram that illustrates the steps of a process according to an embodiment of the present disclosure.

In a step 400 (COUPLING MODE), the processor 104 is configured, for example, to access to a control register (not illustrated) of the coupling and chaining bridge 112 in order to program the circuit 112 by storing a configuration corresponding to an emulation mode of the volatile memory in this register. For example, this configuration defines the actions that the circuit 112 has to realize in response to a write and read operation by the processor. In other embodiments, the circuit 112 is configured to always perform the same operations and needs not to be programmed. However, in this example, the coupling and chaining circuit 112 remains activated. As an example, the coupling and chaining circuit is activated, respectively deactivated, when a specific value, for example the CCB_ON value, respectively the CCB_OFF value, is stored in the control register. In another example, in the configuration that does not match the emulation mode of the volatile memory, the coupling and chaining circuit 112 behaves as a router and is configured to transmit the operations requested by the processor 104 to the requested peripherals without changing the nature of the requested operations. In particular, in the configuration that does not correspond to the emulation mode of the volatile memory, the coupling and chaining circuit 112 is configured to create new transactions, for example via chaining and coupling operations, based on an access request from the processor 104 and to one of the peripherals.

In a step 401 (CPU PROVIDES REF VALUE), the processor 104 transmits, for example via buses 110 and 114, a reference value that is calculated, for example, upstream by the cryptographic circuit 116. A reference value is calculated, for example, based on a data sequence, for example stored in the volatile memory 108. The reference value is further calculated, for example, based on one or more storing addresses in the volatile memory 120.

In a step 402 (WRITING ACCESS REQUESTS AND COUPLING OPERATIONS), the processor 104 transmits a write access request of a data sequence, wherein each data value is associated with a storage address in a volatile memory 120. As a response to the write access request, the coupling and chaining bridge 112 is configured to perform a coupling operation as described in relationship with FIG. 2 between the cryptographic circuit 116 and the volatile memory 120. During the realization of step 402, the processor 104 performs, for example, several writing operations in the volatile memory 120.

Following the writing of each data value in association with its storage value in the memory 120, in the cryptographic circuit 116, a verification value is, for example, generated, or updated. The generation, or the update, of the verification value is, for example, calculated by the cryptographic circuit 116, by application of one or more cryptographic operations on the data value and the storage address. As an example, the one or more cryptographic operations are the calculation of a message authentication code of the data value and storage address. As an example, after data value and storage address, the generated message authentication code is concatenated with the verification value, wherein the verification value is, for example, initially an empty string.

When the data writing sequence to the volatile memory 120 is over, the processor 104 is further configured to transmit, in a step 406 (CORRESPOND?), a write access request for the verification value to the coupling and chaining circuit 112.

As a response to the read access request, the coupling and chaining bridge 112 is configured to perform a verification operation comprising reading the verification value in the circuit 116 and its comparison with the reference value stored in the register 300, as described in relationship with FIG. 3. In particular, the coupling and chaining circuit 112 determines whether the verification value is equal to the reference value that is stored, for example, in the register 300.

In the case of the two values do not correspond (branch N in output of the block 406), this means that the data sequence has not been properly written in the volatile memory 120. As an example, the values of one or more written data values are incorrect and/or have been written at incorrect addresses and/or have been written several times and/or the data sequence has not been written in proper order. In this case, this process ends with a step 407 (SUPPRESSION), wherein the coupling and chaining bridge 112 controls the deletion of the content of the volatile memory 120. In other words, when the data sequence transmitted for writing at the step 401 is not exactly the same as the data sequence that was used for the calculation of the reference value, the content of the memory 120 is deleted.

In the case where, at step 406, it is established the verification value corresponds to the reference value (branch Y in output of the block 406), this means that the data sequence has been properly written to the volatile memory 120. Indeed, the verification value corresponds to the reference value when the data value written in the circuit 116 corresponds the data value of the sequence transmitted by the processor 104, wherein each data value is appended with the right storage address in the memory 120 and wherein the data values are written in the circuit 116, in the order in which the processor commands the writing of the sequence in the volatile memory 120.

In this case, this process ends with a step 408 (ROM EMULATION), wherein the volatile memory 120 becomes available, for example to the co-processor 122, in read-only mode. The coupling and chaining bridge 112, or the circuit 122 after reception of an access request from the coupling and chaining bridge 112, is configured, for example, to forbid any write access request in the volatile memory 120.

An advantage of the described embodiments is that they make it possible to emulate a memory that is available in read-only mode while improving the performances of the circuit about energy consumption. Indeed, a single write and/or read operation by the processor 104 on the bus 110 makes possible all the operations associated with the emulation. Similarly, the described embodiments allow the emulation of a ROM while improving the implementation costs and the circuit authentication costs.

Another advantage of the described embodiments is that they guarantee the integrity of the content of a ROM-type memory.

Another advantage of the described embodiments is that they protect the device against material attacks, for example toward the processor 104.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, other cryptographic algorithms can be used for the calculation process of the verification and reference values. Similarly, the type of cryptographic algorithm implemented by the cryptographic circuit 116 may change.

The invention claimed is:

1. A coupling and chaining bridge circuit, comprising:
- a first coupling to a volatile memory;
- a second coupling to a cryptographic circuit;
- a third coupling to a processor;
- wherein the coupling and chaining bridge circuit is configured to:
  - perform a coupling operation between the volatile memory and the cryptographic circuit in response to a write access request received from the processor, the processor for writing one or more data values to the volatile memory, wherein the write access request includes an address for storing in the volatile memory;
  - wherein the coupling operation comprises:
    - writing the one or more data values to the volatile memory; and
    - for each of the one or more data values, generating a first write access request, in the cryptographic circuit, for the data value, and generating a second write access request, in the cryptographic circuit, for the storage address; and
  - perform a verification operation between the cryptographic circuit and the volatile memory, in response to a read access request received from the processor, of a verification value stored in the cryptographic circuit;
  - wherein the verification operation comprises:
    - comparing the verification value with a reference value stored in the coupling and chaining bridge circuit; and
    - authorizing access to the volatile memory only for reading in response to a result of the comparing.

2. The coupling and chaining bridge circuit according to claim 1, further configured to return a default value to the processor in response to the read access request of the verification value received from the processor.

3. The coupling and chaining bridge circuit according to claim 1, further configured to delete the content of the volatile memory when the result of the comparing indicates that the verification value does not correspond to the reference value.

4. The coupling and chaining bridge circuit according to claim 1, further comprising a register programmable by the processor allowing the configuration of the coupling and chaining bridge circuit.

5. The coupling and chaining bridge circuit according to claim 1, further comprising a second register configured to receive the reference value from the processor.

6. An electronic device, comprising:
- the coupling and chaining bridge circuit according to claim 1;
- the cryptographic circuit coupled to the coupling and chaining bridge circuit via a first bus at the second coupling;
- the volatile memory coupled to the coupling and chaining bridge circuit via a second bus at the first coupling; and
- the processor coupled to the coupling and chaining bridge circuit via a system bus and a third bus at the third coupling.

7. The electronic device according to claim 6, wherein the cryptographic circuit is configured to generate the verification value by performing one or more cryptographic operations on each data value and storage address and based on a secret key, wherein the secret key is accessible only in read-only mode on the cryptographic circuit.

8. The electronic device according to claim 6, further comprising a second cryptographic circuit coupled to the coupling and chaining bridge circuit and comprising the volatile memory.

9. A process, comprising:
- performing a coupling operation through a coupling and chaining bridge circuit of an electronic device, based on the reception, by the coupling and chaining bridge circuit, of a write access request, from a processor of the device, for writing one or more data values in a volatile memory of the device, each data value being associated with a storage address in the volatile memory;
- wherein the coupling operation comprises:
  - intercepting the write access request by the coupling and chaining bridge circuit;
  - for each of the one or more data values, generating a first write access request of the data value and a second write access request of the associated storage address in a first cryptographic circuit; and
  - for each of the one or more data values, writing to the volatile memory;
- executing a verification operation, by the coupling and chaining bridge circuit, based on the reception, by the coupling and chaining bridge circuit, of an access request, from the processor, to read a verification value stored in the first cryptographic circuit;
- wherein the verification operation comprises:
  - reading the verification value by the coupling and chaining bridge circuit;
  - comparing the verification value with a reference value that is stored in the coupling and chaining bridge circuit; and
  - authorizing access, only for reading, to the content of the volatile memory, based on the comparing.

10. The process according to claim 9, further comprising returning by the coupling and chaining bridge circuit a default value to the processor in response to the read access request of the verification value.

11. The process according to claim 9, further comprising generating by the first cryptographic circuit the verification value by applying, to each received data value and to each storage address, one or more cryptographic operations, the one or more cryptographic operations being further performed based on a secret key.

12. The process according to claim 11, wherein the one or more cryptographic operations are hashing operations and/or operations of a cryptographic algorithm of Advanced Encryption Standard-Galois/Counter Mode (AES-GCM) type or of Advanced Encryption Standard-Counter with cipher block chaining message authentication code (AES-CCM) type comprising the generation of said verification value.

13. The process according to claim 9, further comprising transmitting by the processor the reference value to the coupling and chaining bridge circuit before transmitting the write access request.

14. The process according to claim 9, further comprising suppressing content of the volatile memory, controlled by the coupling and chaining bridge circuit, when said comparing determines that the verification value does not correspond to the reference value.

15. The process according to claim 9, further comprising, before the coupling operation, writing by the processor the reference value in a register of the coupling and chaining bridge circuit.

* * * * *